(12) United States Patent
Hapke

(10) Patent No.: US 9,946,677 B2
(45) Date of Patent: Apr. 17, 2018

(54) MANAGING SINGLE-WIRE COMMUNICATIONS

(71) Applicant: Atmel Corporation, San Jose, CA (US)

(72) Inventor: Jeffrey S. Hapke, Monument, CO (US)

(73) Assignee: Atmel Corporation, San Jose, CA (US)

( * ) Notice: Subject to any disclaimer, the term of this patent is extended or adjusted under 35 U.S.C. 154(b) by 424 days.

(21) Appl. No.: 14/621,144

(22) Filed: Feb. 12, 2015

(65) Prior Publication Data

US 2016/0239449 A1 Aug. 18, 2016

(51) Int. Cl.
*G06F 13/20* (2006.01)
*G06F 13/40* (2006.01)
*G06F 13/38* (2006.01)

(52) U.S. Cl.
CPC ........ *G06F 13/4068* (2013.01); *G06F 13/385* (2013.01); *G06F 13/4022* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 4,920,532 A | 4/1990 | Wroblewski | |
| 5,237,322 A | 8/1993 | Heberle | |
| 5,862,354 A | 1/1999 | Curiger et al. | |
| 6,301,680 B1 | 10/2001 | Cypher | |
| 6,969,970 B2 | 11/2005 | Dias et al. | |
| 7,684,482 B2 | 3/2010 | Fong | |
| 8,107,577 B2 | 1/2012 | Ng | |
| 8,683,101 B2 * | 3/2014 | Ingels | G06F 13/4286 710/105 |
| 8,775,707 B2 | 7/2014 | Poulsen | |
| 2004/0123167 A1 * | 6/2004 | Chapuis | H02J 1/102 713/300 |
| 2004/0143710 A1 * | 7/2004 | Walmsley | B41J 2/04505 711/144 |
| 2004/0208200 A1 * | 10/2004 | Hejdeman | H04L 7/044 370/476 |
| 2008/0159432 A1 * | 7/2008 | Ng | H04L 7/02 375/295 |
| 2010/0017553 A1 * | 1/2010 | Laurencin | G06F 13/4027 710/307 |
| 2010/0115165 A1 * | 5/2010 | Bandholz | G06F 13/385 710/105 |

(Continued)

*Primary Examiner* — Henry Tsai
*Assistant Examiner* — Aurangzeb Hassan
(74) *Attorney, Agent, or Firm* — Fish & Richardson P.C.

(57) ABSTRACT

Systems, methods, circuits and computer-readable mediums for managing single-wire communications. In one aspect, a method includes starting a transmission cycle by transmitting a clock pulse to a single-wire bus, sampling a data bit transmitted from a single-wire device through the single-wire bus within the transmission cycle after the transmission of the clock pulse, and determining whether a sampling period of the sampling is smaller than a sampling threshold for the data bit. In response to determining that the sampling period is not smaller than the sampling threshold, the method further includes determining that the transmitted data bit is an invalid data bit, and in response: transmitting a high logic voltage level pulse to the single-wire bus for timeout and restarting the transmission cycle for retransmission of the data bit.

19 Claims, 4 Drawing Sheets

(56) References Cited

U.S. PATENT DOCUMENTS

2012/0030388 A1\* 2/2012 Bas ................ G06F 13/4027
                                              710/106
2012/0102248 A1   4/2012 Tailliet
2012/0144078 A1   6/2012 Poulsen
2013/0073757 A1\* 3/2013 Rettig .............. H04L 12/403
                                              710/106
2013/0322461 A1   12/2013 Poulsen
2015/0339257 A1\* 11/2015 Hug ................. H04L 5/16
                                              710/110
2016/0092385 A1   3/2016 Chilikin
2016/0112159 A1\* 4/2016 Banthia ........... G06Q 20/327
                                              714/748

\* cited by examiner

MANAGING SINGLE-WIRE COMMUNICATIONS

TECHNICAL FIELD

This disclosure relates generally to communications and more particularly to single-wire communications.

BACKGROUND

In single-wire communications, signals, e.g., data and clock information, are transmitted via a single-wire bus. In some cases, a data packet, e.g., a byte, is transmitted, and data errors are undetected until verifying cyclic redundancy check (CRC) at the end of transmission of the data packet. If there exist data transmission errors, e.g., due to bus timing errors, the entire data packet has to be retransmitted, e.g., for a few transmission cycles in order to obtain a valid CRC.

SUMMARY

This specification describes systems, methods, circuits and computer-readable mediums for managing single-wire communications. In one aspect, a method includes: starting a transmission cycle by transmitting a clock pulse to a single-wire bus, sampling a data bit transmitted from a single-wire device through the single-wire bus within the transmission cycle after the transmission of the clock pulse, and determining whether a sampling period of the sampling is smaller than a sampling threshold for the data bit. In response to determining that the sampling period is not smaller than the sampling threshold, the method further includes determining that the transmitted data bit is an invalid data bit, and in response: transmitting a high logic voltage level pulse to the single-wire bus for timeout and restarting the transmission cycle for retransmission of the data bit.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
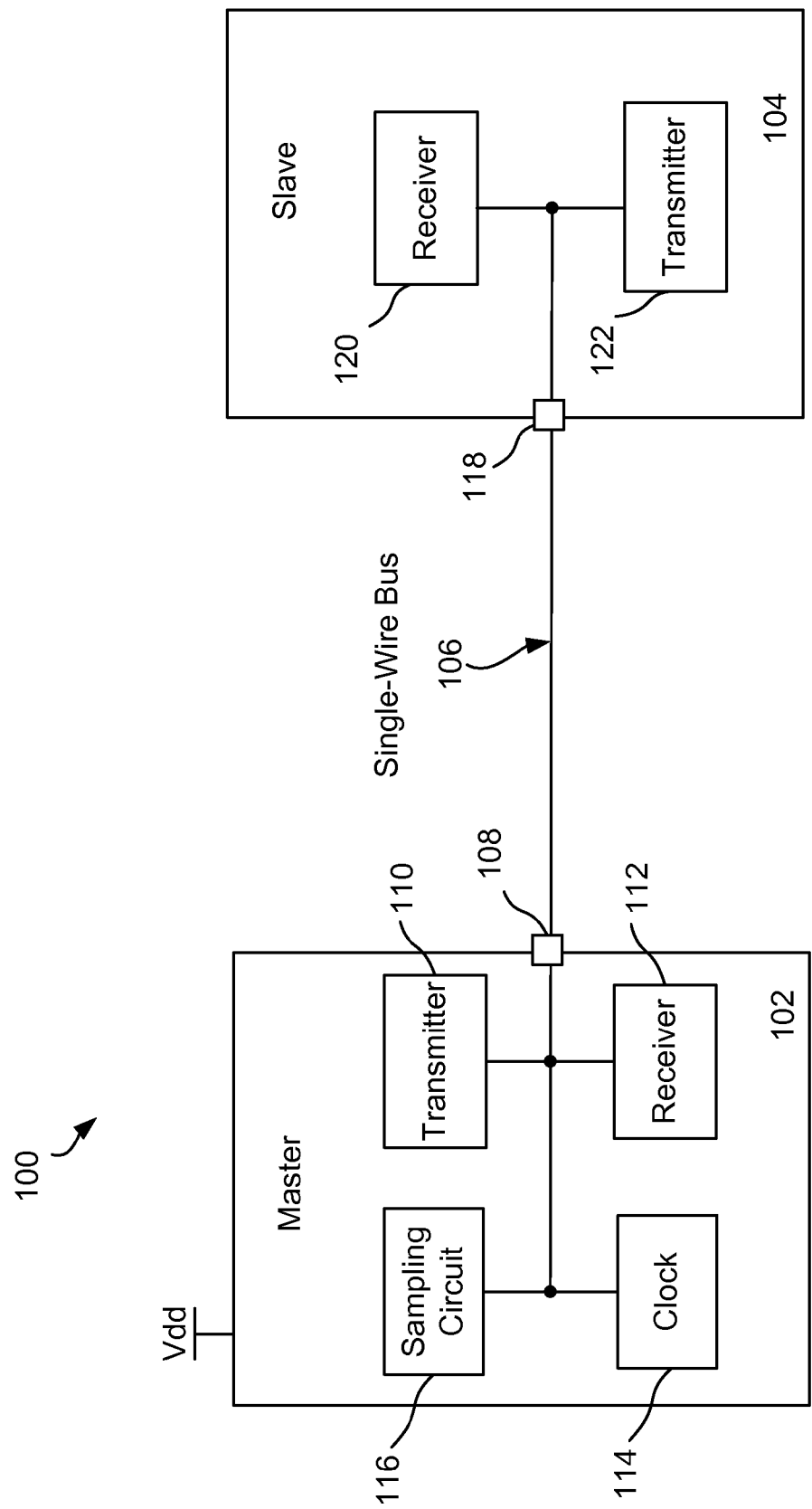
FIG. 1 is a block diagram of an example single-wire communication system.

FIG. 1 is a block diagram of an example system 100, e.g., a single-wire communication system. For purposes of illustration, the system 100 includes a master device 102 and a slave device 104 (or a single-wire device) that are connected by a single wire forming a single-wire bus 106 and share a same reference voltage, e.g., ground. The system 100 can adopt one or more communication protocols for single-wire communications between the master device 102 and the slave device 104 through the single-wire bus 106. The single-wire bus 106 can be a single-wire serial bus, where the master device 102 or/and the slave device 104 transmit data sequentially, e.g., one data bit or a single data bit at a time, over the single-wire bus 106.

The master device 102 can be any appropriate device, e.g., a circuit or a user system such as a mobile device. The master device 102 includes an interface 108 connected to the single-wire bus 106. The master device 102 can provide both power and input/output for the slave device 104 at the interface 108. The master device 102 includes a transmitter 110 and a receiver 112 for transmitting communications signals to and receiving communications signals from the slave device 104 through the single-wire bus 106, respectively. The transmitter 110 and/or the receiver 112 can include a counter. The master device 102 can include other components such as a processor.

The master device 102 also powers the slave device 104 through the single-wire bus 106. As illustrated in FIG. 1, the master device 102 receives a power supply voltage, e.g., Vdd. The slave device 104 draws its power supply from a regulation of a signal, e.g., a communications signal transmitted by the master device 102 on the single-wire bus 106, that has its idle level at a high logic voltage level.

The master device 102 includes a clock circuit 114 for generating a clock signal, e.g., a clock pulse. The clock circuit 114 provides the clock signal to the transmitter 110. The master device 102 can initiate or start a transmission cycle by transmitting the clock signal to the slave device 104. The transmission cycle is a time period for data transmission, e.g., transmission of a data bit, between the master device 102 and the slave device 104.

In some cases, the clock circuit 114 is configured to dynamically adapt a frequency of the clock signal, e.g., based on configuration information of the master device 102 such as available execution resources, system load, and/or system responsiveness. In some cases, the clock circuit 114 is a system clock and generates a constant clock signal without obtaining the configuration information of the master device 102.

The master device 102 includes a sampling circuit 116 that is configured to sample an input, e.g., a serial input, at the interface 108 from the single-wire bus 106, e.g., a data bit transmitted from the slave device 104. For example, in a transmission cycle, after the transmitter 110 transmits a clock pulse to the slave device 104 to initiate the transmission cycle, the sampling circuit 116 starts to sample the serial input at the interface 108 within the transmission cycle, e.g., at a sampling frequency $f_S$ for a number of times $N_S$ or for a sampling period $T_S$. Meanwhile, in response to receiving the clock pulse from the master device 102, the slave device 104 transmits a data bit, e.g., a single data bit, to the single-wire bus 106 then to the interface 108 of the master device 102. Thus the sampling circuit 116 can sample the data bit transmitted from the slave device 104 during the sampling period.

The sampling circuit 116 of the master device 102 can produce a number of samples or sampling points from sampling the input at the interface 108. The master device 102 and/or the slave device 104 can predetermine a sampling threshold of sampling points for the transmitted data bit. In some examples, the sampling threshold can be determined based on Nyquist sampling criterion. A data bit can have a maximum frequency $f_{data}$ and/or a time period $t_{data}$. The sampling circuit 116 samples the input for a time period $T_S$. In some cases, the sampling circuit 116 samples the transmitted data bit based on 1:1 Nyquist sampling. In some cases, the sampling of the transmitted data bit is not a 1:1 Nyquist sampling. The sampling frequency may not be fixed. For example, a sampling clock can be interrupted by another system call, thus the sampling period $T_S$ can vary as well. In such a way, at least one sample point during the time period $t_{data}$ can be obtained. If any of the sampling points is '0', the transmitted data bit is sampled to be a '0'; otherwise, the transmitted data bit is sampled to be a '1'.

The master device 102, e.g., the sampling circuit 116, can determine whether the time period $T_S$ is small enough to assure at least one valid sample of the data bit. For example, the master device 102, e.g., the sampling circuit 116, can set a sampling time threshold $T_{thr}$ and determine whether $T_S$ is smaller than $T_{thr}$, that is, whether the number of sampling points is smaller than the sampling threshold or whether the number of sampling points has been obtained during the sampling time threshold $T_{thr}$. If the time period $T_S$ is smaller than the sampling time threshold $T_{thr}$, that is, the number of sampling points is smaller than the sampling threshold or the number of sampling points has been obtained during the sampling time threshold $T_{thr}$, the master device 102 determines that the data bit transmitted from the slave device 104 is a valid data bit. In response to determining that the transmitted data bit is a valid data bit, the master device 102 can store the valid data bit. The master device 102 can transmit an acknowledgement to the slave device 104. Then the master device 102 can wait until an end of the transmission cycle and then start a sequential transmission cycle, in which the slave device 104 will transmit a sequential data bit.

If the time period $T_S$ is not smaller than (identical to or larger than) the sampling time threshold $T_{thr}$, that is, the number of sampling points is not smaller than (identical to or larger than) the sampling threshold or the number of sampling points has not been obtained during the sampling time threshold $T_{thr}$, the master device 102 cannot assure that the sampled data is valid or not. Then the master device determines that there is a transmission error for the data bit transmitted from the slave device 104 or that the transmitted data bit is an invalid data bit. In response to determining that the transmitted data bit is an invalid data bit, the master device 102 can keep a signal on the single-wire bus 106 at a high logic voltage level, e.g., by transmitting a high logic voltage level pulse to the single-wire bus 106, for a time period (timeout) longer than a reference duration.

The reference duration can be determined based on a time period of a data bit, e.g., three times of the timer period. As a consequence of determining that the transmitted data bit is an invalid data bit, the master device 102 will not transmit an acknowledgement to the slave device 104. Instead, the master device 102 restarts the transmission cycle to transmit a sequential clock pulse to the slave device 104. In response to receiving no acknowledgement for the data bit and receiving the sequential clock pulse, the slave device 104 retransmits the data bit to the master device 102. In such a way, the transmission error of the data bit can be detected and corrected.

In some implementations, the sampling circuit 116 samples the input at a sampling frequency $f_S$ for a number of times $N_S$, that is, the number of sampling points the sampling circuit 116 produced is fixed, which is $N_S$. The sampling period $T_S$ to acquire the sampling points varies. For examples, the sampling frequency $f_S$ can be chosen to be not smaller than twice of the maximum frequency $f_{data}$, that is, $f_S \geq 2f_{data}$. The master device 102 can include a timer to count the sampling period $T_S$ by counting a number of system clock cycles within the sampling period. The system 100 includes a system clock that defines a system clock cycle, e.g., to be a time constant. The master device 102, e.g., the sampling circuit 116, can determine whether the sample period $T_S$ is smaller than a sampling time threshold $T_{thr}$ for sampling the transmitted data bit, or whether the number of sampling points has been obtained during the sampling time threshold $T_{thr}$. The sampling time threshold $T_{thr}$ can be determined based on the time period $t_{data}$ of the data bit, e.g., $T_{thr}=3t_{data}$. In some cases, the minimum time to acquire a sample point is $t_{min}$. Suppose that $N_S$ sampling points are taken during sampling, then the expected sampling period is $N_S*t_{min}$. The sampling threshold $T_{thr}$ can be set to be the expected sampling period plus the time period of the data bit, that is, $T_{thr}=N_S*t_{min}+t_{data}$. If the actual sampling period $T_S$ to acquire the samples is not smaller than (larger than or equal to) $T_{thr}$, then the master device 102 cannot determine whether the transmitted data bit is a valid data bit. For example, if any of the sample points is "0", the master device 102 can determine the data bit is "0". However, if some of the sample points is not "0", e.g., all of the sample points is "1", the data bit is unknown, which can be "0" or "1". In this case, the master device 102 can time out by not acknowledging the data bit and forces the slave device 104 to resend.

If the master device 102 determines that the sampling period $T_S$ is smaller than the sampling time threshold $T_{thr}$, that is, the number of sampling points has been obtained within the sampling time threshold $T_{thr}$, the master device 102 determines that the sampling period ensures nyquist sampling of the data bit and/or that the transmitted data bit is a valid data bit. In response to determining that the transmitted data bit is a valid data bit, the master device 102 can store the data bit and transmit an acknowledgement to the slave device 104. Then the master device 102 can wait until an end of the transmission cycle and then start a sequential transmission cycle, in which the slave device 104 will transmit a sequential data bit.

If the master device 102 determines that the sampling period $T_S$ is not smaller than the sampling time threshold $T_{thr}$, that is, the number of sampling points has not been obtained during the sampling time threshold $T_{thr}$, the master device 102 determines that the sampling period is too long such that the sampling of the data bit cannot assure that the transmitted data bit is a valid data bit, that is, the transmitted data bit may be an invalid data bit. In response to determining that the transmitted data bit is an invalid data bit, the master device 102 can transmit a high logic voltage level pulse to the single-wire bus 106 for timeout without transmitting an acknowledgement to the slave device 104 and restart the transmission cycle. If the slave device 104 does not receive an acknowledgement from the master device 102, the slave device 104 can reset the data bit for retransmission.

The slave device 104 can be an integrated circuit, for example, including a single-wire interface 118, a receiver 120 and a transmitter 122. The slave device 104 can include other components such as a processor. In some examples, the slave device 104 receives power from and communicates with the single-wire bus 106 at the single-wire interface 118. The single-wire interface 118 can be a pin on an external portion of the integrated circuit. In some examples, the slave device 104 includes a pin to receive a power supply voltage Vdd, e.g., from the power supply for the master device 102 or from a separate power supply.

The master device 102 can be coupled with the slave device 104 by wire bonding to the single wire or by any other appropriate electrical coupling. In some implementations, the slave device 104 is an integrated circuit having only two pins, one for the single-wire interface 118 and the other for the reference voltage, e.g., ground. In some other implementations, the slave device 104 has other pins in addition to the single-wire interface 118.

In some implementations, the system 100 includes two or more slave devices including the slave device 104. The two or more slave devices are connected to the single-wire bus 106 at respective single-wire interfaces. The master device 102 can be configured to provide both power and input/output for the two or more slave devices through the single-wire bus 106. In some cases, the master device 102 identifies and addresses one of the slave devices, e.g., at a period of time, for corresponding communication with the slave device.

The receiver 120 of the slave device 104 is configured to receive data and clock information from the master device 102 through the single-wire bus 106 at the single-wire interface 118. The transmitter 122 is configured to transmit data bits, e.g., sequentially, to the master device 102 through the single-wire interface 108 thus the single-wire bus 106. The receiver 120 and/or the transmitter 122 can include a counter.

According to a communication protocol between the master device 102 and the slave device 104, in a transmission cycle, the transmitter 122 of the slave device 104 transmits a single data bit after the receiver 120 of the slave device 104 receives an initial clock pulse from the master device 102 through the single-wire interface 118. If the receiver 120 further receives an acknowledgement after the transmitter 122 transmits the single data bit, the slave device 104, e.g., the transmitter 122, can set a sequential single data bit for transmission in a sequential transmission cycle. If the receiver 120 does not receive an acknowledgement after the transmitter 122 transmits the single data bit, the slave device 104, e.g., the transmitter 122, can reset the single data bit for retransmission in a sequential transmission cycle.

The slave device 104 may lose power during a process. For example, if a clock pulse transmitted from the master device 102 is at a low logic voltage level, the slave device 104 may not be able to obtain power from the clock pulse transmitted to the single-wire bus 106 from the master device 102. Thus the slave device 104 may not be able to maintain power when the master device 102 transmits the clock pulse to the slave device 104. As a consequence of the slave device 104 losing power, the slave device 104 can fail to transmit a data bit to the master device 102. Thus the communications between the master device 102 and the slave device 104 need to restart from the beginning. In some cases, after the slave device 104 loses power and before a sequential clock pulse is sent, the slave device 104 can receive a logic "1" or a high voltage for a period of time from the single-wire bus 106, e.g., a high logic voltage level pulse from the master device 102, which allows the slave device 104 to power back up, e.g., by charging an internal capacitor of the slave device 104.

In some implementations, the system 100, e.g., the master device 102 includes a counter or timer configured to count a number of system clock cycles or a time period for the transmission of the clock pulse. The master device 102 can determine whether the number of clock cycles is smaller than a threshold number of clock cycles for the slave device 104, that is, whether the time period for the transmission of the clock pulse is smaller than a threshold time period. The threshold number of clock cycles can be determined such that the slave device 104 is able to maintain power within the threshold number of clock cycles and is not able to maintain power beyond the threshold number of clock cycles.

In response to determining that the number of clock cycles is smaller than the threshold number of clock cycles, which indicates that the slave device 104 can maintain the power during the transmission of the clock pulse, the master device 102 can start to sample an input at the interface 108 thus to sample a data bit transmitted from the slave device 104. In response to determining that the number of clock cycles is not smaller than the threshold number, which indicates that the slave device 104 is not able to maintain power during the transmission of the clock pulse, the master device 102 can transmit a high logic voltage level pulse to the single-wire bus 106 to power the slave device 104 up and then restart the transmission cycle by transmitting a sequential clock pulse. The time duration of the high logic voltage level pulse can be determined based on the characteristics of the slave device 104.

Similarly, if an acknowledgement transmitted from the master device 102 is at a low logic voltage level, the slave device 104 may not be able to maintain power when the master device 102 transmits the acknowledgement to the slave device 104. The system 100 or the master device 102 can include another counter or timer to count a number of system clock cycles for the transmission of the acknowledgement. The master device 102 can determine whether the number of system clock cycles is smaller than the threshold number of clock cycles for the slave device 104 and then determine whether to sample a data bit from the slave device 104 or to restart the transmission cycle.

Using the communication protocol, the system 100 can perform bit error detection and correction for each single data bit, e.g., when a byte (e.g., multiple sequential data bits) or a block of data bits or bytes is to be transmitted in the system 100, e.g., in a difficult I/O environment. For example, in a transmission cycle, the slave device 104 transmits a single data bit to the master device 102 after receiving an initial clock pulse from the master device 102. The master device 102 performs bit error detection on the transmitted single data bit by determining whether a number of sampling points produced from sampling the single data bit is smaller than a sampling threshold for the single data bit and/or whether the slave device 104 maintains power during the transmission of the clock pulse.

In response to determining that the sampling period is smaller than the sampling time threshold and/or the slave device 104 maintains power during the transmission of the clock pulse, the master device 102 transmits an acknowledgement to the slave device 104.

The master device 102 can further determine whether there is a bit error for the single data bit by determining whether the slave device maintains power during the transmission of the acknowledgement. If the master device 102 determines that there is no bit error in the transmitted single data bit, the master device 102 can start a sequential transmission cycle for transmission of a sequential data bit. If the master device 102 determines there is a bit error for the transmitted single data bit, the master device 102 does not transmit the acknowledgement but performs bit correction by timing out the transmission cycle and restarting the transmission cycle for retransmission of the single data bit.

Correspondingly, the slave device 104 can determine whether there is a bit error for the single data bit by determining whether the slave device 104 can receive an acknowledgement from the master device 102 after transmitting the single data bit for a specific period of time. If the slave device 104 receives an acknowledgement from the master device 102, that is, there is no bit error, the slave device 104 can set a sequential single data bit for transmission in a sequential transmission cycle. If the slave device 104 does not receive an acknowledgement after transmitting the single data bit for the specific period of time, that is, there is a bit error for the transmitted single data bit, the slave device 104 can reset the single data bit for retransmission in a sequential transmission cycle.

The system 100 can adopt one or more communication protocols for single-wire communications between the master device 102 and the slave device 104 through the single-wire bus 106. The communication protocols can work for bi-directional transmission between the master device 102 and the slave device 104. In a communication protocol, as noted above, in a transmission cycle, the slave device 104 transmits a data bit to the master device 102. The master device 102 samples the data bit and determines whether to transmit an acknowledgement to the slave device 104.

In another communication protocol, the master device 102 transmits a data bit to the slave device 104. The slave device 104 samples the data bit and determines whether to transmit an acknowledgement to the master device 102. For example, the master device 102 can start a transmission cycle by transmitting a clock pulse to the single-wire bus 106. If the clock pulse is at a low logic voltage level, the master device 102 can count a number of system clock cycles for the transmission of the clock pulse and determine whether the number of clock cycles is smaller than a threshold number of system clock cycles for the slave device 104. The slave device 104 is able to maintain power within the threshold number of clock cycles. If the number of clock cycles is smaller than the threshold number, the master device 102 transmits a data bit to the slave device 104.

If the master device 102 receives an acknowledgement from the slave device 104 after transmitting the data bit, the master device 102 waits until an end of the transmission cycle and then starts a sequential transmission cycle. If the master device 102 determines that the slave device 104 has not transmitted an acknowledgement within a specified time period after the master device 102 transmits the second data bit, the master device 102 can transmit a high logic voltage level pulse to the single-wire bus 106 for timeout and reset the data bit for transmission.

Example Timing Diagram and Process

Figure 2:
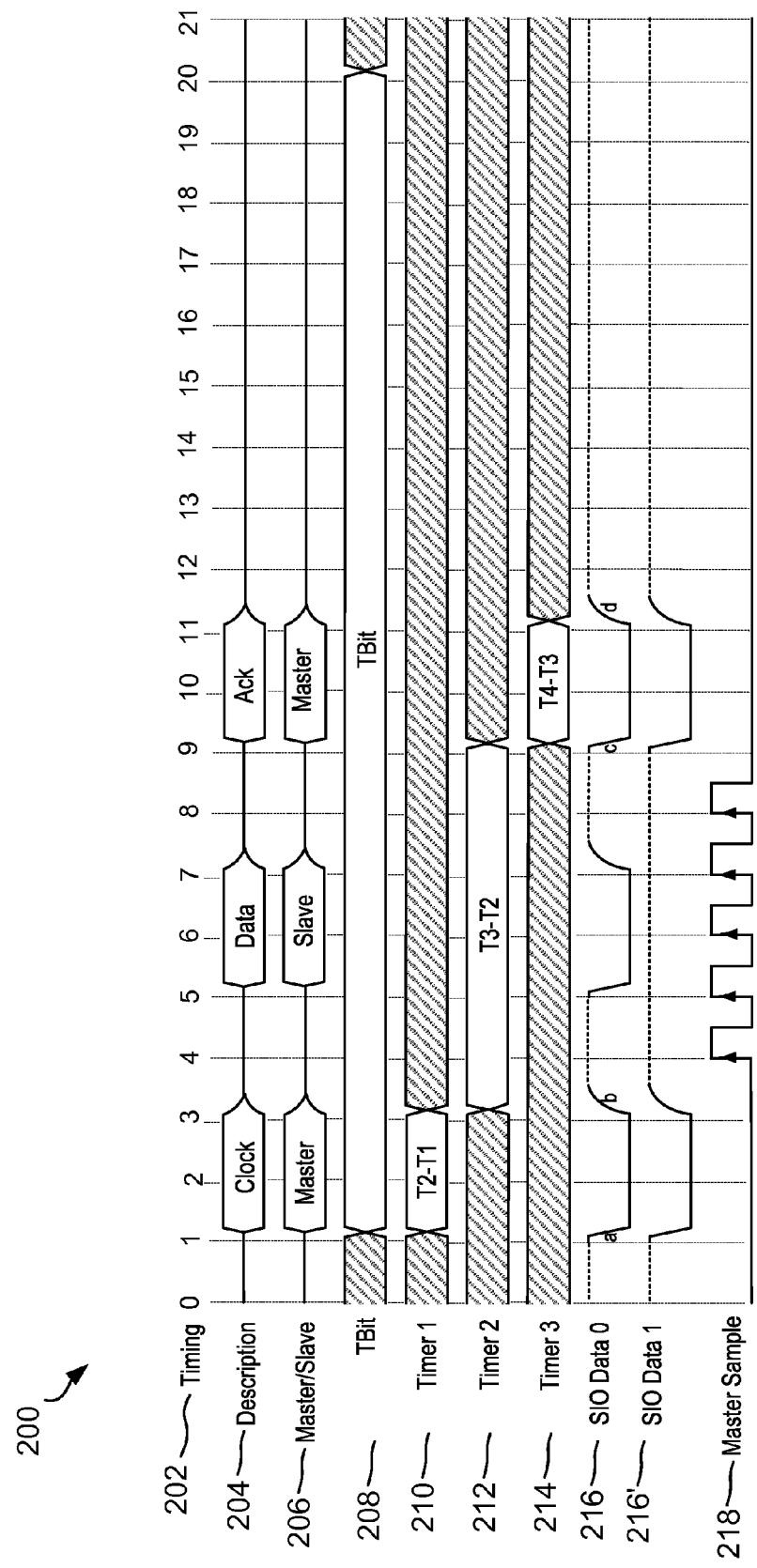
FIG. 2 is an example timing diagram illustrating bit transmission performed by a single-wire communication system.
Figure 3:
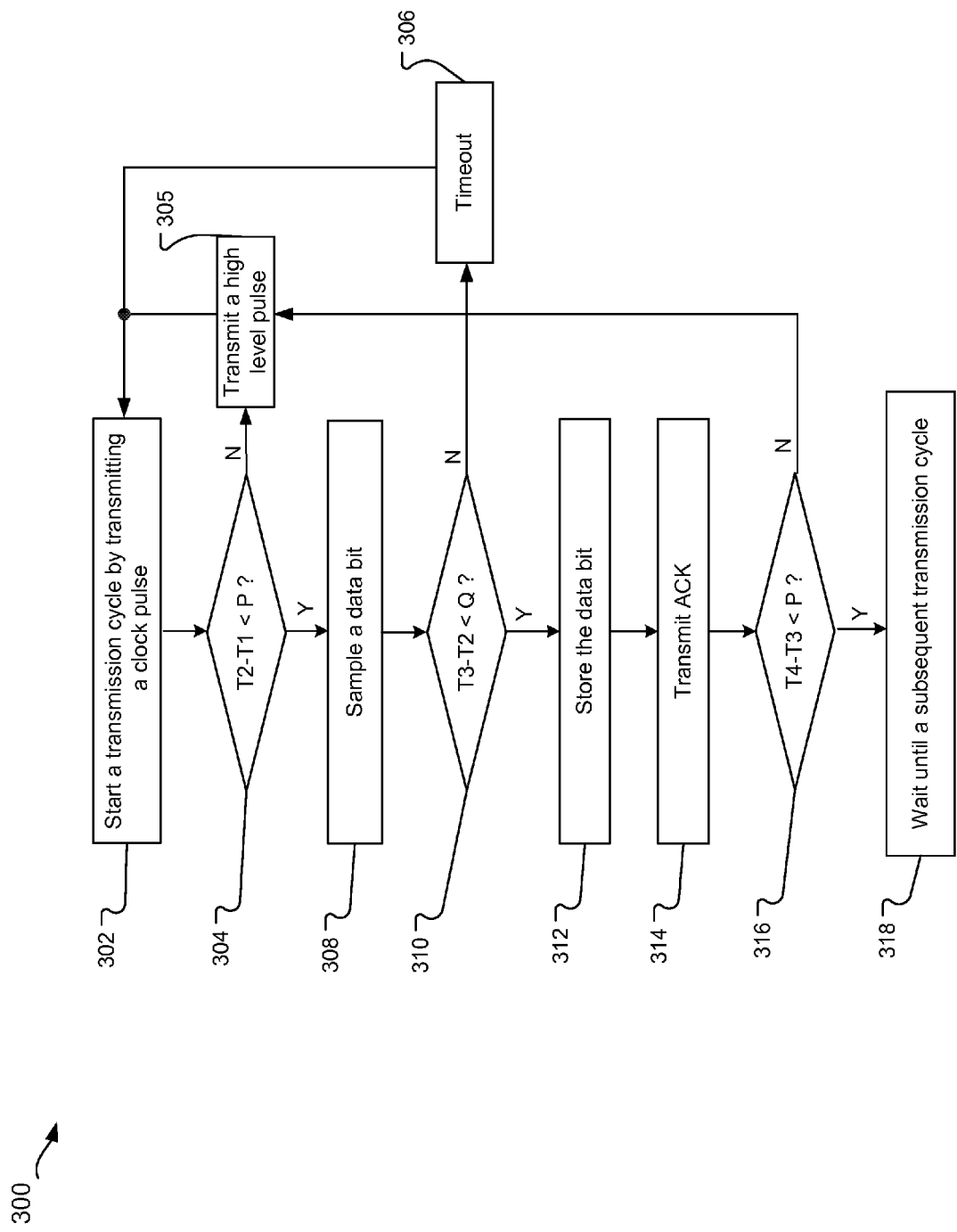
FIG. 3 is a flow diagram of an example process illustrating the timing diagram of FIG. 2.

FIG. 2 shows an example timing diagram 200 illustrating data transmission by a single-wire communication system, e.g., the system 100 of FIG. 1. FIG. 3 shows an example process 300 corresponding to the example timing diagram 200 of FIG. 2.

At different timing points 202, a bus driver 206 of a single-wire bus, e.g., the single-wire bus 106 of FIG. 1, can be a master device, e.g., the master device 102 of FIG. 1, or a slave device, e.g., the slave device 104 of FIG. 1. A communications signal 204 can be a clock pulse, a data bit, or an acknowledgement. The single-wire communication system can define a length of a transmission cycle 208, e.g., "TBit" in FIG. 2 from a first timing point "1" to a second timing point "20".

The bus driver 206 can transmit one or more pulses, e.g., a low logic voltage level pulse or a high logic voltage level pulse, to the single-wire bus. The one or more pulses can represent a logic data bit 0 or a logic data bit 1. For example, a signal 216 on the single-wire bus includes a logic data bit 0 at a low logic voltage level, while a signal 216' on the single-wire bus includes a logic data bit 1 at a high logic voltage level. Timers 210, 212 and 214 count respective time periods within the transmission cycle 208. The system, e.g., the master device, can include timers 210, 212, and 214.

Referring to FIG. 3 now, the master device starts a transmission cycle by transmitting a clock pulse to the single-wire bus (step 302). The clock pulse is at a low logic voltage level. Timer 210 is triggered (or enabled) to start at a timing point T1 by a falling edge of the clock pulse, e.g., "a" of the signal 216 of FIG. 2, and end at a timing point T2 by a rising edge of the clock pulse, e.g., "b" of the signal 216 of FIG. 2. Timer 210 can count a number of system clock pulses to determine a time period T2-T1 for the transmission of the clock pulse.

The master device determines whether the time period T2-T1 is smaller than a threshold time period P (step 304). The threshold time period P can be determined such that the slave device is able to maintain power within the threshold time period P and is not able to maintain power beyond the threshold time period P. In some implementations, the threshold time period P can be represented by a threshold number of system clock cycles, and the master device determines whether a number of system clock pulses for the time period T2-T1 is smaller than the threshold number of system clock cycles for the threshold time period P.

If the master device determines that the time period T2-T1 is not smaller than (larger than or identical to) the threshold time period P, indicating that the slave device is not able to maintain power during the time period, the master device transmits a high logic voltage level pulse to the single-wire bus for powering up the slave device (step 305) and restarts the transmission cycle to step 302.

If the master device determines that the time period T2-T1 is smaller than the threshold time period P, indicating that the slave device is able to maintain power during the time period, the master device starts to sample an input from the single-wire bus. The master device samples the input for a number of times (or for a period of time) within the transmission cycle 208. After receiving the clock pulse, the slave device transmits a single data bit, e.g., a logic 0 of the signal 216 or a logic 1 of the signal 216', to the single-wire bus. Thus the master device samples the single data bit transmitted from the slave device (step 308).

The master device determines whether the sampling period T3-T2 is smaller than a threshold time period Q for sampling the single data bit (310). As noted above, the threshold time period Q for sampling the single data bit can be determined based on Nyquist sampling criterion, e.g., 1:1 Nyquist sampling or Nyquist sampling with variable sampling frequencies. If the master device determines that the sampling period T3-T2 is not smaller than the threshold time period Q, indicating that the master device cannot assure the sampled data is valid or not, and the master device can determine that there is a transmission error for the transmitted single data bit and transmit a high logic voltage level pulse to the single-wire bus for timeout (step 306) and then restart the transmission cycle (step 302). The high logic voltage level pulse for timeout in step 306 can be different from the high logic voltage level pulse for powering up the slave device in step 305. For example, the time duration for the high logic voltage level pulse for timeout can be longer than that of the high logic voltage level pulse for powering up the slave device.

If the master device determines that the sampling period T3-T2 is smaller than the threshold time period Q, indicating that the master device assures at least one valid sampling data of the single data bit, and the master device can determine that the transmitted single data bit is a valid single data bit. The master device can store the data bit (312) and transmit an acknowledgement to the single-wire bus (314). The acknowledgement can be at a low logic voltage level, e.g., the "ACK" signal in the signal 216 or 216'.

In some implementations, the master device determines the sampling period T3-T2 by counting a number of system clock cycles for sampling the input a number of times. In some implementations, the master device uses timer 212 to determine the sampling period T3-T2. For example, as shown in FIG. 2, timer 212 is triggered to start at the timing point T2 by a rising edge of the clock pulse, e.g., "b" of the signal 216 of FIG. 2, and end at the timing point T3 by a falling edge of the acknowledgement, e.g., "c" of the signal 216 of FIG. 2.

The master device determines whether a timer period T4-T3 for the transmission of the acknowledgement is smaller than the threshold time period P (step 316). The master device can user timer 214 to determine the time period T4-T3. For example, as shown in FIG. 2, timer 214 is triggered to start at the timing point T3 by the falling edge of the acknowledgement, e.g., "c" of the signal 216 of FIG. 2, and end at the timing point T4 by a rising edge of the acknowledgement, e.g., "d" of the signal 216 of FIG. 2.

If the master device determines that the time period T4-T3 is not smaller than the threshold time period P, the master device transmits a high logical voltage level pulse to the single-wire bus (305) and restarts the transmission cycle (302). If the master device determines that the time period T4-T3 is smaller than the threshold time period P, the master device waits until an end of the transmission cycle and starts a sequential transmission cycle (318). In the sequential transmission cycle, the slave device will set a sequential data bit for transmission to the master device.

In some examples, if a delay is introduced during step 308, T3-T2 may be too long, and the master device cannot determine whether the sampled data is valid or not. The master device can throw away the sampling points, and time out by not sending the acknowledgement. Then the slave device can transmit the data bit again, and eventually the master device can receive the data bit correctly. A delay can be introduced at any point from T1 to T4, the master device can detect the delay by checking the time samples T1, T2, T3 and T4 and recover correspondingly.

Example Flowchart

Figure 4:
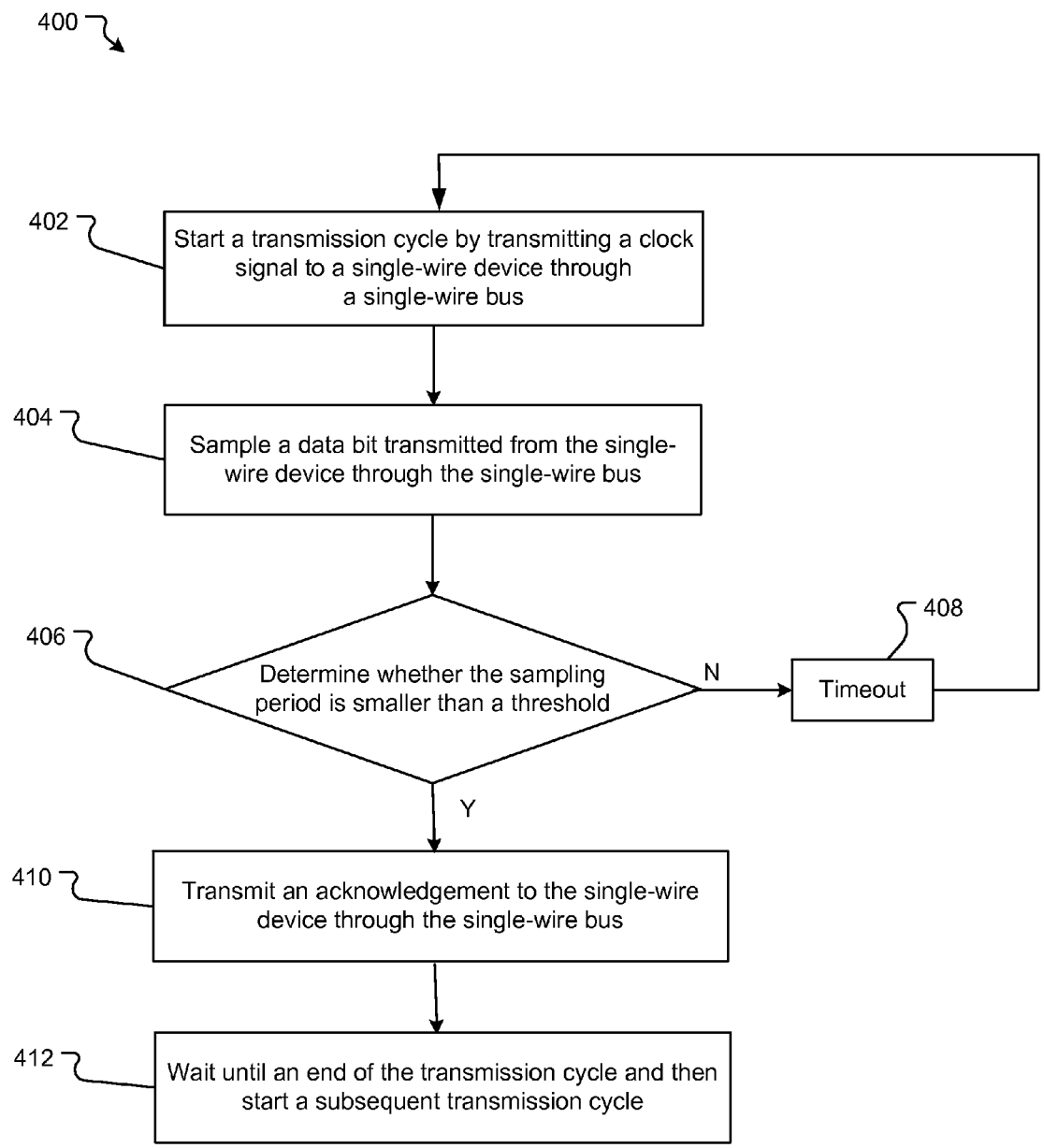
FIG. 4 is a flow diagram of an example process performed by a single-wire communication system.

FIG. 4 is a flow diagram of an example process 400 performed by a single-wire communication system, e.g., the single-wire communication system 100 of FIG. 1. The system includes a master device, e.g., the master device 102 of FIG. 1, and a single-wire device, e.g., the slave device 104 of FIG. 1. The master device and the single-wire device communicate through a single-wire bus, e.g., the single-wire bus 106 of FIG. 1, according to one or more single-wire communication protocols.

The master device starts a transmission cycle by transmitting a clock signal to the single-wire device through the single-wire bus (step 402). The clock signal can be a clock pulse, e.g., generated by a clocking circuit or a system clock. The clock pulse can be at a low logic voltage level.

In some implementations, the master device determines whether the single-wire device is able to maintain power during the transmission of the clock signal. The master device can use a timer to count a number of system clock cycles to determine a time period for the transmission of the clock signal and compare the time period to a threshold time period for maintaining power for the single-wire device. If the master device determines that the single-wire device is not able to maintain power during the transmission, the master device transmits a high logical voltage level pulse to the single-wire bus and restarts the transmission cycle (step 402). If the master device determines that the single-wire device is able to maintain power during the transmission, the process 400 goes to step 404.

The master device samples a data bit transmitted from the single-wire device through the single-wire bus (step 404). The master device can start to sample an input from the single-wire bus after transmitting the clock signal. The single-wire device transmits the data bit to the single-wire bus after receiving the clock signal from the master device. Thus, the master device can sample the data bit transmitted from the single-wire device within the transmission cycle. The data bit can be a single data bit, e.g., a logic 0 or 1.

The master device determines whether a sampling period of the sampling is smaller than a sampling threshold for the data bit (step 406). As noted above, the master device can sample the input for a number of times. The sampling threshold can be determined based on the time period of the data bit.

If the master device determines that the sampling period is not smaller than the sampling threshold, that is, the master device determines that there is a transmission error and the transmitted data bit is an invalid data bit, the master device transmits a high-level voltage pulse for timeout (step 408) and restarts the transmission cycle (step 402). The single-wire device resets the data bit for retransmission.

If the master device determines that the sampling period is smaller than the sampling threshold, that is, the master device determines that there is at least one valid sample of the data bit, the master device transmits an acknowledgement to the single-wire device through the single-wire bus (step 410). The acknowledgement can be at a low logic voltage level. The master device can also store the single data bit as a valid single data bit.

In some implementations, the master device determines whether the single-wire device is able to maintain power during the transmission of the acknowledgement. The master device can use a timer to count a number of system clock cycles to determine a time period for the transmission of the acknowledgement and compare the time period to a threshold time period for maintaining power for the single-wire device. If the master device determines that the single-wire device is not able to maintain power during the transmission, the master device transmits a high logic voltage level pulse to the single-wire bus and restarts the transmission cycle (step 402). If the master device determines that the single-wire device is able to maintain power during the transmission, the process 400 goes to step 412.

The master device waits until an end of the transmission cycle and then starts a sequential transmission cycle (step 412). The transmission cycle can be a predefined time period. The master device can transmit a high logic voltage level pulse to the single-wire bus for the rest of the transmission cycle after transmitting the acknowledgement. Then the master device can start the sequential transmission cycle by transmitting a sequential clock signal to the single-wire device. The single-wire device sets a sequential data bit for transmission to the master device when the single-wire device receives the sequential clock signal.

Particular embodiments of the subject matter described in this specification can be implemented so as to realize one or more of the following advantages. First, by monitoring each data bit transmission (e.g., in transmitting a byte or multiple sequential data bits), a single-wire communication system can immediately catch a bus timing error, e.g., due to a master timing problem such as a task operating system (OS) interruption/preemption or a scheduling issue, and repair the error by forcing the data bit to retransmit. Second, the single-wire communication system enables to detect and correct each bit as the bit arrives, which eliminates retransmission of entire packets or bytes and thereby reduces total transaction time. Third, the single-wire communication system enables early error detection and correction for bits, which allows an increase in overall data transmission rate and an increase in overall transmission accuracy and reliability. Fourth, the single-wire communication system can be used in difficult I/O environments.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method comprising:
   starting, by a master device, a transmission cycle by transmitting a clock pulse to a single-wire bus, wherein a single-wire device draws power from and communicates with the master device through the single-wire bus;
   sampling, by the master device and after the transmission of the clock pulse, a data bit transmitted from the single-wire device through the single-wire bus within the transmission cycle;
   determining, by the master device, whether a sampling period of the sampling is smaller than a sampling threshold for the data bit; and
   in response to determining that the sampling period is not smaller than the sampling threshold, determining that the transmitted data bit is an invalid data bit, and in response:
      transmitting a high logic voltage level pulse to the single-wire bus for a period of time, wherein the period of time is a timeout period longer than a reference duration determined based on a time period of the data bit; and then
      restarting the transmission cycle for retransmission of the data bit.

2. The method of claim 1, wherein the clock pulse is at a low logic voltage level, the method further comprising:
  counting a number of system clock cycles for the transmission of the clock pulse; and
  determining whether the number of system clock cycles is smaller than a threshold number of system clock cycles for the single-wire device, the single-wire device being able to maintain power within the threshold number of system clock cycles.

3. The method of claim 2, wherein sampling a data bit comprises:
  in response to determining that the number of system clock cycles is smaller than the threshold number, starting to sample the data bit.

4. The method of claim 2, further comprising:
  in response to determining that the number of system clock cycles is not smaller than the threshold number, transmitting a second high logic voltage level pulse to the single-wire bus for powering up the single-wire device and restarting the transmission cycle.

5. The method of claim 1, further comprising:
  starting a second transmission cycle by transmitting a second clock pulse to the single-wire bus;
  sampling a second data bit transmitted from the single-wire device through the single-wire bus within the second transmission cycle; and
  determining that a second sampling period of sampling the second data bit is smaller than a second sampling threshold for the second data bit, and in response:
    determining that the transmitted second data bit is a valid data bit; and
    transmitting, by the master device, an acknowledgement to the single-wire device through the single-wire bus.

6. The method of claim 5, wherein the acknowledgement is at a low logic voltage level, the method further comprising:
  counting a number of system clock cycles for the transmission of the acknowledgement; and
  determining whether the number of system clock cycles is smaller than a threshold number of system clock cycles for the single-wire device, the single-wire device being able to maintain power within the threshold number of system clock cycles.

7. The method of claim 6, further comprising one of
  in response to determining that the number of system clock cycles is smaller than the threshold number, waiting until an end of the second transmission cycle, then starting a sequential transmission cycle for transmission of a sequential data bit, and
  in response to determining that the number of system clock cycles is not smaller than the threshold number, transmitting a second high logic voltage level pulse to the single-wire bus for powering up the single-wire device and restarting the second transmission cycle for retransmission of the second data bit.

8. The method of claim 1, further comprising:
  starting, by the master device, a second transmission cycle by transmitting a second clock pulse to the single-wire bus, the second clock pulse being at a low logic voltage level;
  counting a number of system clock cycles for the transmission of the second clock pulse; and
  determining that the number of system clock cycles is smaller than a threshold number of system clock cycles for the single-wire device, the single-wire device being able to maintain power within the threshold number of system clock cycles, and in response:
    transmitting, by the master device, a second data bit to the single-wire device through the single-wire bus.

9. The method of claim 8, further comprising:
  receiving an acknowledgement from the single-wire device through the single-wire bus; and
  waiting until an end of the second transmission cycle and then starting a sequential transmission cycle for transmission of a sequential data bit.

10. The method of claim 8, further comprising:
  determining that the single-wire device has not transmitted an acknowledgement within a specified time period after the master device transmits the second data bit, and in response:
    transmitting a second high logic voltage level pulse to the single-wire bus for timeout; and
    restarting the second transmission cycle for retransmission of the second data bit.

11. A device comprising:
  an interface configured to couple to a single-wire bus and provide a communications signal to a single-wire device through the single-wire bus;
  a clocking circuit configured to generate a clock pulse for a transmission cycle;
  a transmitter configured to transmit the clock pulse to the single-wire bus at a start of the transmission cycle;
  a receiver configured to receive a data bit that is transmitted from the single-wire device through the single-wire bus within the transmission cycle; and
  a sampling circuit configured to sample the data bit received by the receiver and determine whether a sampling period of sampling the data bit is smaller than a sampling threshold for the data bit,
  wherein the transmitter is configured to:
    in response to determining that the sampling period is smaller than the sampling threshold, transmit an acknowledgement to the single-wire device through the single-wire bus, and
  wherein the device is configured to, in response to determining that the sampling period is not smaller than the sampling threshold,
    transmit a high logic voltage level pulse to the single-wire bus for a period of time, wherein the period of time is a timeout period longer than a reference duration determined based on a time period of the data bit, and then
    restart the transmission cycle for transmission of the data bit.

12. The device of claim 11, wherein the clock pulse is at a low logic voltage level, and
  wherein the device is configured to:
    count a number of system clock cycles for the transmission of the clock pulse; and
    determine whether the number of system clock cycles is smaller than a threshold number of system clock cycles for the single-wire device, the single-wire device being able to maintain power within the threshold number of system clock cycles.

13. The device of claim 12, wherein the device is configured to:
  in response to determining that the number of system clock cycles is smaller than the threshold number, start to sample the data bit; and
  in response to determining that the number of system clock cycles is not smaller than the threshold number, transmit a high logic voltage level pulse to the single-wire bus for powering up the single-wire device and restart the transmission cycle.

14. The device of claim 11, wherein the acknowledgement is at a low logic voltage level, and wherein the device is configured to:
   count a number of system clock cycles for the transmission of the acknowledgement; and
   determine whether the number of system clock cycles is smaller than a threshold number of system clock cycles for the single-wire device, the single-wire device being able to maintain power within the threshold number of system clock cycles.

15. The device of claim 14, wherein the device is further configured to:
   in response to determining that the number of system clock cycles is smaller than the threshold number, wait until an end of the transmission cycle, and then start a sequential transmission cycle for transmission of a sequential data bit; and
   in response to determining that the number of clock cycles is not smaller than the threshold number, transmit a high logic voltage level pulse to the single-wire bus and restart the transmission cycle for retransmission of the data bit.

16. The device of claim 11, wherein the device is configured to:
   start a second transmission cycle by transmitting a second clock pulse to the single-wire bus, the second clock pulse being at a low logic voltage level;
   count a number of system clock cycles for the transmission of the second clock pulse; and
   determine that the number of system clock cycles is smaller than a threshold number of system clock cycles for the single-wire device, the single-wire device being able to maintain power within a period having the threshold number of system clock cycles, and in response:
      transmit a second data bit to the single-wire device through the single-wire bus.

17. The device of claim 16, wherein the device is configured to:
   receive a second acknowledgement from the single-wire device through the single-wire bus; and
   wait until an end of the second transmission cycle and then start a sequential transmission cycle for transmission of a sequential data bit.

18. The device of claim 16, wherein the device is configured to:
   determine that the single-wire device has not transmitted an acknowledgement within a specified time period after transmitting the second data bit, and in response:
      transmit a high logic voltage level pulse to the single-wire bus for timeout; and
      restart the second transmission cycle for transmission of the second data bit.

19. A single-wire device comprising:
   a single-wire interface configured to couple to a single-wire bus and receive a communications signal transmitted from a master device through the single-wire bus;
   a receiver configured to receive a clock pulse that is transmitted from the master device through the single-wire bus at a start of a transmission cycle; and
   a transmitter configured to transmit a data bit to the master device through the single-wire bus within the transmission cycle after receiving the clock pulse,
   wherein the single-wire device is configured to:
      in response to receiving an acknowledgement from the master device through the single-wire bus after transmitting the data bit, wait until an end of the transmission cycle and set a sequential data bit for transmission in a sequential transmission cycle; and
      in response to receiving no acknowledgement from the master device within a specified time period after transmitting the data bit and receiving a high logic voltage level pulse from the single-wire bus for a period of time, reset the data bit for retransmission in a sequential transmission cycle,
   wherein the period of time is a timeout period longer than a reference duration determined based on a time period of the data bit.

* * * * *